(12) United States Patent
Mangano

(10) Patent No.: US 10,620,914 B2
(45) Date of Patent: *Apr. 14, 2020

(54) METHOD AND SYSTEM FOR PERFORMING DIVISION/MULTIPLICATION OPERATIONS IN DIGITAL PROCESSORS, CORRESPONDING DEVICE AND COMPUTER PROGRAM PRODUCT

(71) Applicant: STMicroelectronics S.r.l., Agrate Brianza (IT)

(72) Inventor: Daniele Mangano, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,977

(22) Filed: Oct. 22, 2018

(65) Prior Publication Data
US 2019/0056910 A1    Feb. 21, 2019

Related U.S. Application Data

(63) Continuation of application No. 14/313,273, filed on Jun. 24, 2014, now Pat. No. 10,108,396.

(30) Foreign Application Priority Data

Jun. 25, 2013    (IT) .............................. TO2013A0520

(51) Int. Cl.
*G06F 5/01*    (2006.01)
*G06F 7/52*    (2006.01)
(Continued)

(52) U.S. Cl.
CPC .................. *G06F 5/01* (2013.01); *G06F 7/52* (2013.01); *G06F 7/523* (2013.01); *G06F 7/535* (2013.01)

(58) Field of Classification Search
CPC ............. G06F 7/52; G06F 7/523; G06F 7/535
See application file for complete search history.

(56) References Cited

U.S. PATENT DOCUMENTS 4,475,167 A     10/1984   Chen
5,696,713 A  *  12/1997   Kovacs ................... G06F 7/535
                                                      708/653

(Continued)

*Primary Examiner* — Chuong D Ngo
(74) *Attorney, Agent, or Firm* — Seed Intellectual Property Law Group LLP

(57) ABSTRACT

A digital processor, such as, e.g., a divider in a PID controller, performs a mathematical operation such as division (or multiplication) involving operands represented by strings of bit signals and an operator to produce an operation result. The processor is configured by identifying first and second power-of-two approximating values of the operator as the nearest lower and nearest higher power-of-two values to the operator. The operation is performed on the input operands by means of the first and second power-of-two approximating values of the operator by shifting the bit signals in the operands by using the first and second power-of-two approximating values in an alternated sequence to produce: first approximate results by using the first power-of-two approximating value, second approximate results by using the second power-of-two approximating value. The average of the first and second approximate results is representative of the accurate result of the operation.

19 Claims, 5 Drawing Sheets

(51) Int. Cl.
    *G06F 7/523*     (2006.01)
    *G06F 7/535*     (2006.01)

(56) References Cited

U.S. PATENT DOCUMENTS

| | | |
|---|---|---|
| 6,321,245 B1 | 11/2001 | Cukier et al. |
| 10,108,396 B2 * | 10/2018 | Mangano ................ G06F 5/01 |
| 2003/0128799 A1 | 7/2003 | Clausen et al. |
| 2010/0070547 A1 | 3/2010 | Chan |

* cited by examiner

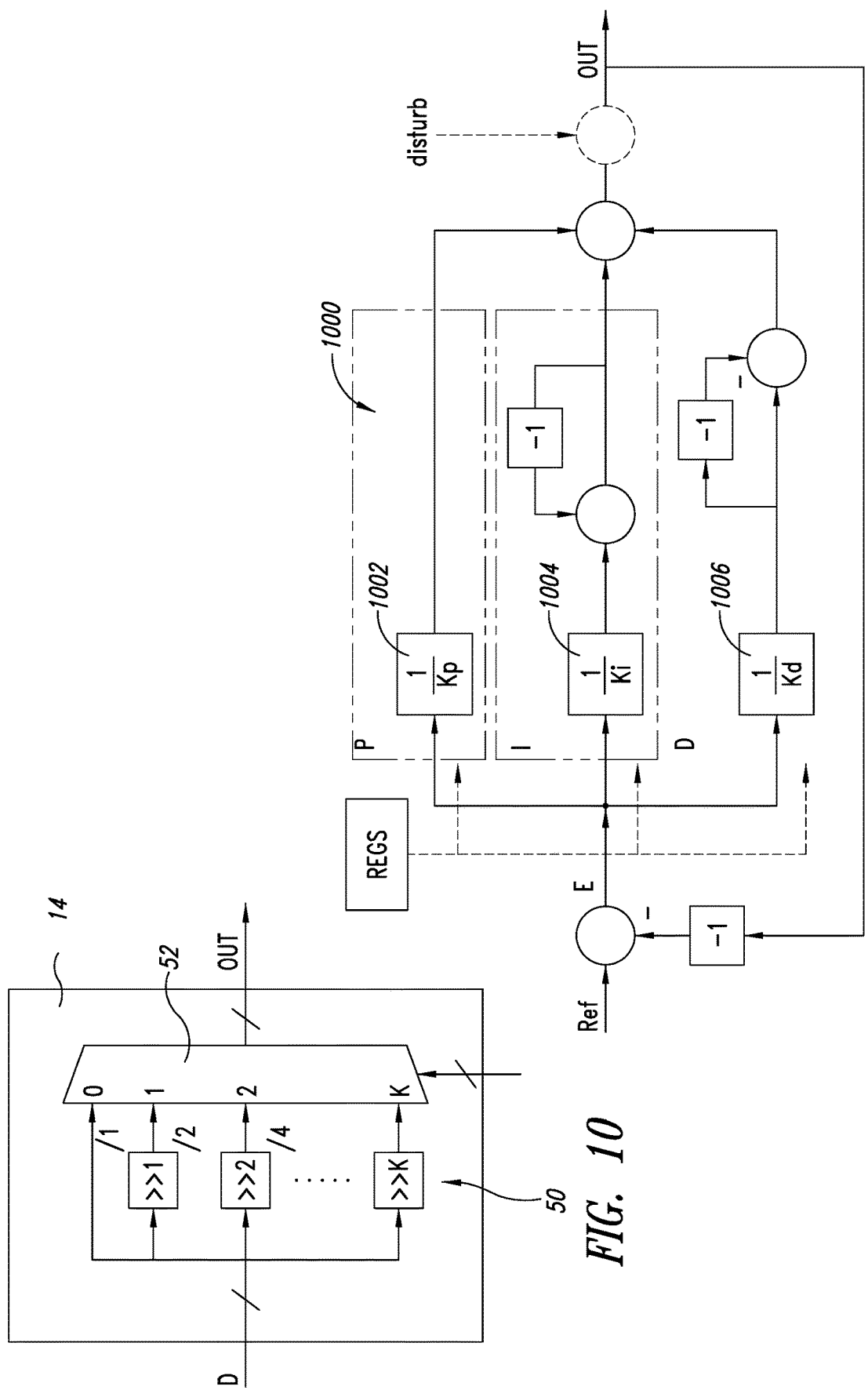

METHOD AND SYSTEM FOR PERFORMING DIVISION/MULTIPLICATION OPERATIONS IN DIGITAL PROCESSORS, CORRESPONDING DEVICE AND COMPUTER PROGRAM PRODUCT

BACKGROUND

Technical Field

The disclosure relates to computing by means of digital devices.

One or more embodiments may related to performing mathematical operations such as division or multiplication, e.g., in Integrated Circuit (IC) products.

Description of the Related Art

IC products increasingly embed digital hardware components for implementing specific control or DSP functions. The chip (e.g., silicon) area hosting these dedicated hardware components may be one of the factors affecting the cost of the product.

Control or Digital Signal Processor (DSP) functions may involve, e.g., divider blocks. As a consequence, reducing the cost of dividers may be a key for achieving competitive designs.

Digital circuits aimed at performing division may be costly, and cost may be a key differentiation aspect when designing a related Application Specific Integrated Circuit or ASIC.

The literature describes various different approaches to implement arithmetic division, mostly devised to be applied for CPUs, e.g., with the aim of implementing high performance floating point division, possibly by resorting to rather complex numerical techniques.

When targeting low-cost division of integer numbers, a sequential approach may be an option, in which case the cost may be reduced with a possible negative effect on performance. Exemplary of simple and well known sequential approaches to division are "Repeated Subtraction" and "Non-restoring" parallel division.

In repeated subtraction the divisor (or denominator) M may be sequentially subtracted from the dividend (or numerator) D and the quotient Q=D/M is identified by the number of times subtraction may take place before reaching a negative value. Each step of this algorithm consumes one clock cycle. As a consequence, achieving the division product, that is the quotient Q, may involve Q clock cycles. This may be too high a figure for many applications to achieve a reasonable speed. Also, a multi-cycle may not always be feasible as this may involve a fast extra clock, and such a fast clock (Q times faster) may lead to extra cost and extra power.

Combinatorial "non-restoring" divider implementations are disclosed. A problem with this approach is the intrinsic complexity of the implementation and the related cost.

It will be otherwise appreciated that the discussion above and related to division may apply also to multiplication (division being in fact a multiplication where the multiplier has a negative exponent). For instance, multiplication may be implemented as repeated addition (sum) where the multiplicand is sequentially summed or added a number of times identified by the multiplier.

BRIEF SUMMARY

One or more embodiments may refer to a corresponding system, a corresponding apparatus including such as system, as well as to a computer program product loadable in the memory of at least one computer and including software code portions for executing the steps of the method when the product is run on at least one computer. As used herein, reference to such a computer program product is understood as being equivalent to reference to a computer-readable means containing instructions for controlling the processing system in order to co-ordinate implementation of a method. Reference to "at least one computer" is intended to highlight the possibility of embodiments being implemented in modular and/or distributed form.

One or more embodiments may provide low-cost solutions to implement dividers/multipliers suitable for use, e.g., in control and DSP components.

One or more embodiments may be used to divide or multiply a signal by a constant or by another signal stored in a register.

One or more embodiments may rely on the concept that the results of an operation may be imprecise on a short time basis but become quite precise if averaged over longer time periods.

One or more embodiments may be applied when no need subsists of producing an exact result "punctually" (e.g., on a clock cycle basis or in a narrow time window).

One or more embodiments may be applied, e.g., in digital control systems or in digital filters (e.g., DSP) as used, for instance, in processing sensor data and/or in motor/lighting control applications.

One or more embodiments may offer one or more of the following advantages:
reduced silicon area,
simple logic implementation,
combinatorial operation possible (output may be immediately available),
reduced power consumption,
no additional faster clock needed.

In an embodiment, a method of operating a digital processor in performing a mathematical operation out of division and multiplication, the operation involving operands represented by strings of bit signals and an operator to produce an operation result, comprises: a) identifying a first power-of-two approximating value of said operator as the nearest power-of-two value lower than said operator, a second power-of-two approximating value of said operator as the nearest power-of-two value higher than said operator; b) performing said operation on said operands by means of said first and second power-of-two approximating values of said operator by shifting the bit signals in said strings of bit signals by using said first and second power-of-two approximating values of said operator in an alternated sequence to produce: first approximate results by using said first power-of-two approximating value of said operator, second approximate results by using said second power-of-two approximating value of said operator, whereby the average of said first and second approximate results is representative of said result of operation out of division and multiplication. In an embodiment, the method includes performing said operation on said operands by means of said first and second power-of-two approximating values of said operator in an alternated sequence wherein the operation is performed: a certain number of times by using the first approximating value to produce first approximate results, and a certain number of times by using the second approximating value to produce first approximate results. In an embodiment, said alternated sequence is periodic with a period, wherein the operation is performed a first number of times in the period by using the first approximating value and a second number of times in the period by using the second approximating value. In an embodiment, the method includes varying said alternated sequence by varying the interleaving of performing said operation by using said first power-of-two approximating value of said operator and by using said second power-of-two approximating value of said operator. In an embodiment, the method includes omitting average processing said first approximate results and said second approximate results, whereby said average representative of said result of operation out of division and multiplication derives from said first approximate results and said second approximate results being alternatively output. In an embodiment, the method include: identifying which one of said first power-of-two approximating value and said second power-of-two approximating value is the nearer approximating value having the lower difference with respect to the value of said operator; performing said operation using the nearer approximating value thus identified more often than the other approximating value.

In an embodiment, a digital processor system is configured to perform a mathematical operation out of division and multiplication, the operation involving operands represented by strings of bit signals and an operator to produce an operation result, the system including a shifter for performing said operation on said operands by shifting the bit signals in said strings of bit signals, the system configured to perform one of the methods described herein. In an embodiment, said shifter includes a non-averaging output stage, whereby said shifter outputs an alternated sequence of said first approximate results and said second approximate results. In an embodiment, a digital processor device includes at least one digital processor system. In an embodiment, said alternated sequence of said first approximate results and said second approximate results output by said shifter is propagated in the device in the absence of average processing.

In an embodiment, a method comprises: performing, using one or more configured processing devices, a mathematical operation on an operand digital signal with an operator by, shifting bits of the operand digital signal by a first number of bit positions, the first number of bit positions corresponding to a largest power-of-two value less than the operator, generating a first approximate result; shifting bits of the operand digital signal by a second number of bit positions, the second number of bit positions corresponding to a smallest power-of-two value greater than the operator, generating a second approximate result; and generating a result of the mathematical operation based on the first and second approximate results. In an embodiment, generating the result of the mathematical operation comprises averaging the first and second approximate results. In an embodiment, the method includes: shifting bits of the operand digital signal by the first number of bit positions a first plurality of times, generating a set of first approximate results; shifting bits of the operand digital signal by the second number of bit positions a second plurality of times, generating a set of second approximate results; and generating the result of the mathematical operation based on the first and second sets of approximate results. In an embodiment, the method includes: alternately generating a subset of the set of first approximate results followed by a subset of the set of second approximate results. In an embodiment, said alternating is periodic with a first number of the set of first approximate results and a second number of the set of second approximate results being generated in each period. In an embodiment, the method includes interleaving generation of the set of first approximate results with generation of the set of second approximate results. In an embodiment, the method includes averaging the set of first approximate results and the set of second approximate results. In an embodiment, the method includes: determining which one of the first number of bit positions and the second number of bit positions corresponds to a power-of-two closest to the operator; and performing shifting of the operand digital signal using the determined one of the number of bit positions more often than shifting is performed using the other one of the number of bit positions. In an embodiment, the method includes: determining which one of the first number of bit positions and the second number of bit positions corresponds to a power-of-two closest to the operator; and setting values of the first number of times and the second number of times based on the determination. In an embodiment, the mathematical operation is one of an addition operation and a subtraction operation. In an embodiment, the operand digital signal varies with time. In an embodiment, a device comprises: an input configured to receive one or more digital signals; and one or more processing devices coupled to the input and configured to: shift bits of received digital signals by a first number of bit positions, the first number of bit positions corresponding to a largest power-of-two value less than a mathematical operator, to generate first approximate results; shift bits of received digital signals by a second number of bit positions, the second number of bit positions corresponding to a smallest power-of-two value greater than the mathematical operator, to generate second approximate results; and generate a result of a mathematical operation with the operator based on the first and second approximate results. In an embodiment, the one or more processing devices comprise one or more shifters configured to shift bits of received digital signals. In an embodiment, the one or more processing devices include an output stage configured to output an alternating sequence of said first approximate results and said second approximate results. In an embodiment, the one or more processing devices include an averaging block configured to average the first and second approximate results. In an embodiment, the one or more processing devices are configured to: shift bits of received digital signals by the first number of bit positions a first plurality of times, generating a set of first approximate results; shift bits of received digital signals by the second number of bit positions a second plurality of times, generating a set of second approximate results; and generate the result of the mathematical operation based on the first and second sets of approximate results. In an embodiment, the one or more processing devices are configured to: alternately generate a subset of the set of first approximate results followed by a subset of the set of second approximate results. In an embodiment, the one or more processing devices are configured to interleave generation of the set of first approximate results with generation of the set of second approximate results. In an embodiment, the one or more processing devices are configured to: identify one of the first number of bit positions and the second number of bit positions which corresponds to a power-of-two closest to the operator; and set values of the first number of times and the second number of times based on the identification. In an embodiment, the mathematical operation is one of an addition operation and a subtraction operation.

In an embodiment, a non-transitory computer-readable medium's contents configure one or more processing devices to perform a mathematical operation on an operand digital signal with an operator by, shifting bits of the operand digital signal by a first number of bit positions, the first number of bit positions corresponding to a largest power-of-two value less than the operator, generating a first approximate result; shifting bits of the operand digital signal by a second number of bit positions, the second number of bit positions corresponding to a smallest power-of-two value greater than the operator, generating a second approximate result; and generating a result of the mathematical operation based on the first and second approximate results. In an embodiment, performing the mathematical operation includes: shifting bits of the operand digital signal by the first number of bit positions a first plurality of times, generating a set of first approximate results; shifting bits of the operand digital signal by the second number of bit positions a second plurality of times, generating a set of second approximate results; and generating the result of the mathematical operation based on the first and second sets of approximate results. In an embodiment, performing the mathematical operation includes interleaving generation of the set of first approximate results with generation of the set of second approximate results. In an embodiment, performing the mathematical operation includes: identifying one of the first number of bit positions and the second number of bit positions which corresponds to a power-of-two closest to the operator; and setting values of the first number of times and the second number of times based on the identification.

In an embodiment, a system comprises: a mathematical operation block configured to: shift bits of digital signals by a first number of bit positions, the first number of bit positions corresponding to a largest power-of-two value less than a mathematical operator, to generate first approximate results; shift bits of digital signals by a second number of bit positions, the second number of bit positions corresponding to a smallest power-of-two value greater than the mathematical operator, to generate second approximate results; and generate result signals based on the first and second approximate results; and one or more processing devices coupled to the mathematical operation block and configured to receive the result signals. In an embodiment, the one or more processing devices comprises a proportional and integral controller configured to receive the result signals.

BRIEF DESCRIPTION OF THE SEVERAL VIEWS OF THE FIGURES

One or more embodiments will now be described, purely by way of non-limiting example, with reference to the annexed drawings, wherein:

FIG. 10 is a block diagram of an exemplary implementation of a barrel shifter in an embodiment; and FIG. 11 is a block diagram of a PID controller device according to an embodiment.

DETAILED DESCRIPTION

Figure 1:
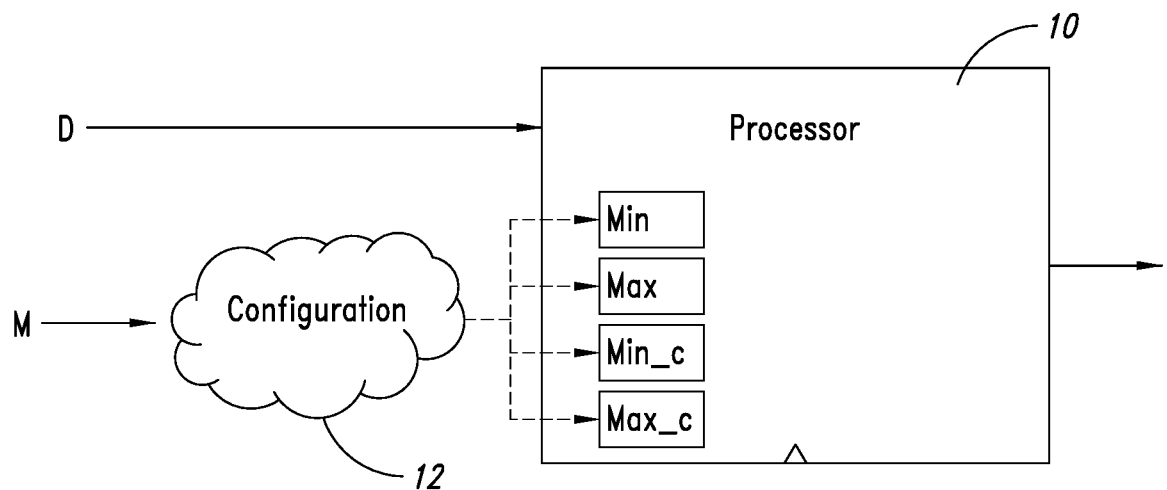
FIG. 1 is a schematic representation of a divider embodiment.

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "one or more embodiments" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for the convenience of the reader and hence do not define the scope of protection or the scope of the embodiments.

One or more embodiments as considered herein may relate to producing the result of an operation such as a division or multiplication by using a digital processor (e.g., a DSP, but one or more embodiments may apply to any type of processor), e.g., a device where the values of the factors involved are represented by strings of binary "bit" signals, for instance of strings of zeroes ("0") and ones ("1").

In one or more embodiments such operation out of division and multiplication may be performed on an operand (dividend/numerator or multiplicand) represented by a first string of bit signals by using an operator (divisor/denominator or multiplier).

In one or more embodiments either or both of the operand and the operator may include a string of bit signals input to and/or stored in a digital processor or ancillary circuitry thereto (e.g., a memory).

While the rest of this detailed description will primarily refer to division as the exemplary operation, it will be otherwise understood that the disclosure may apply mutatis mutandis to one or more embodiments where the operation performed is multiplication.

Consequently:

"operand" may apply both to a dividend/numerator in division as exemplified herein and to a multiplicand in multiplication;

"operator" may apply both to a divisor/denominator in division as exemplified herein and to a multiplier in multiplication;

"result" (possibly approximate) may apply both to a quotient in division as exemplified herein and to a product in multiplication.

A basic concept underlying one or more embodiments is that the operation (e.g., division) result can be inaccurate (imprecise) over short time periods but more precise as a (e.g., time) average over longer time periods, that is the effect of the operation result may be inaccurate over short time periods but more precise as an average over long time periods.

One or more embodiments may involve identifying:

a first power-of-two approximating value of the operator (e.g., divisor) as the nearest power-of-two value lower than the operator, and a second power-of-two approximating value of the operator as the nearest power-of-two value higher than the operator.

In one or more embodiments, the operation may be performed by using the first and second power-of-two approximating values in the place of the "exact" value of the operator.

By being performed by using approximating values that are power-of-two values the operation may thus be performed easily by merely shifting the bit signals in the string of bit signals representative of the operand of a number of positions identified by the exponent of the power-of-two signal.

For instance dividing a certain operand by, e.g., 4 (i.e., $2^2$, where the exponent of the power-two-value is 2) may simply be by shifting towards the least significant bit positions (e.g., to the right) by two positions the bits in the string of bits signals representative of the operand. Similarly, multiplying a certain operand by 4 may be simply by shifting towards the most significant bit positions (e.g., to the left) by two positions the bits in the string of bits signals representative of the operand.

In one or more embodiments, the operation performed using the approximate values for the operator may produce, alternatively:

first approximate results when using the first power-of-two approximating value of said operator, second approximate results using the second power-of-two approximating value of said operator.

For instance, in the exemplary case of a division by 6 (operator), the two power-of-two approximating values will be 4 ($2^2$) and 8 ($2^3$), respectively.

The first approximate results obtained when using the first power-of-two approximating value (e.g., 4) in the place of the exact value of the operator (that is 6) will be higher than the exact result.

The second approximate results obtained when using the second power-of-two approximating value (e.g., 8) in the place of the exact value of the operator (that is 6) will be lower than the exact result.

In one or more embodiments, the (final) result of operation, be it division or multiplication, may result as a weighted average of the first and second approximate results.

In one or more embodiments the operation (e.g., division) may be performed by using alternatively a pair of power-of-two approximating values (Min and Max, lower and higher, respectively) nearest to the divisor M and adjusting or playing with the durations—that is the number of times or cycles—of the division by Min (Min_c) and by Max (Max_c) to achieve averagely precise results in long term periods.

In one or more embodiments the operation may then be periodic, for example with period equal to Min_c+Max_c.

For instance, in one or more embodiments, within a period, the divider output is D/Min for Min_c cycles and D/Max for Max_c cycles, where D is the dividend.

In one or more embodiments, if considered as an average over the period Min_c+Max_c (this being a weighted average, the weights being the values for Min_c and Max_c), the approximated results may provide a reasonably accurate result, e.g., in terms of the effects produced within the system where the divider/multiplier is included.

It will otherwise be appreciated that, in one or more embodiments, a final accurate result may arise as a weighted average of the first and second approximate results even in the absence of any averaging function/module proper: the averaging effect will in fact be simply due to the fact that divider/multiplier will alternatively output to the system where the divider/multiplier is included the first approximate results (e.g., D/Min) for Min_c cycles and the second approximate results (e.g., D/Max) for Max_c cycles.

Once again it will be noted that, while the rest of this detailed description will primarily refer to division as the exemplary operation, the disclosure may apply *mutatis mutandis* to one or more embodiments where the operation performed is multiplication.

FIG. 1 is a schematic representation of an exemplary divider embodiment including a processor function/module 10 which is fed with an operand (here dividend/numerator D) and an operator (here divisor M) in view of performing an operation (here division). In one or more embodiments either or both of the operand and the operator may include a string of bit signals.

In one or more embodiments the operator M may be input to a configuration module/function 12 to identify the values for the pair of power-of-two approximating values Min and Max and the numbers of cycles of the division by Min (Min_c) and by Max (Max_c). Based on these values the processor function/module 10 may then perform on the operand D the shift operations which produce the approximate results and thus give rise, as an average of these approximate results, to the final, more accurate result.

In one or more embodiments, the final result of division (quotient) Q may be expressed as a function of D (dividend) and M (divisor) as:

$Q=D/M\approx[(D/\text{Min})*\text{Min}\_c)+(D/\text{Max})*\text{Max}\_c)]/(\text{Min}\_c+\text{Max}\_c)$ This formula basically expresses a time average over the interval Min_c+Max_c (divider period).

In one or more embodiments, the configuration module/function 12 may specify the divider configuration (e.g., the parameters Min, Max, Min_c and Max_c to satisfy the formula reported above) through dedicated input signals or registers.

In one or more embodiments the pair of power of approximating values (Min and Max) nearest to the divisor M may be identified (e.g., computed or read in table, such as a LUT where they have been stored) as:

$\text{Min}=2^{\lfloor \log 2M \rfloor}$ and $\text{Max}=2^{\lceil \log 2M \rceil}$ Also, the formula for Q reproduced above can be inverted as follows:

$\text{Max}\_c=(\text{Max}/\text{Min})*[(M-\text{Min})/(\text{Max}-M)]*\text{Min}\_c$ Since the amount (Max/Min)*[(M−Min)/(Max−M)] is a rational number, a pair of integers satisfying the above formula always exists.

Figure 2:
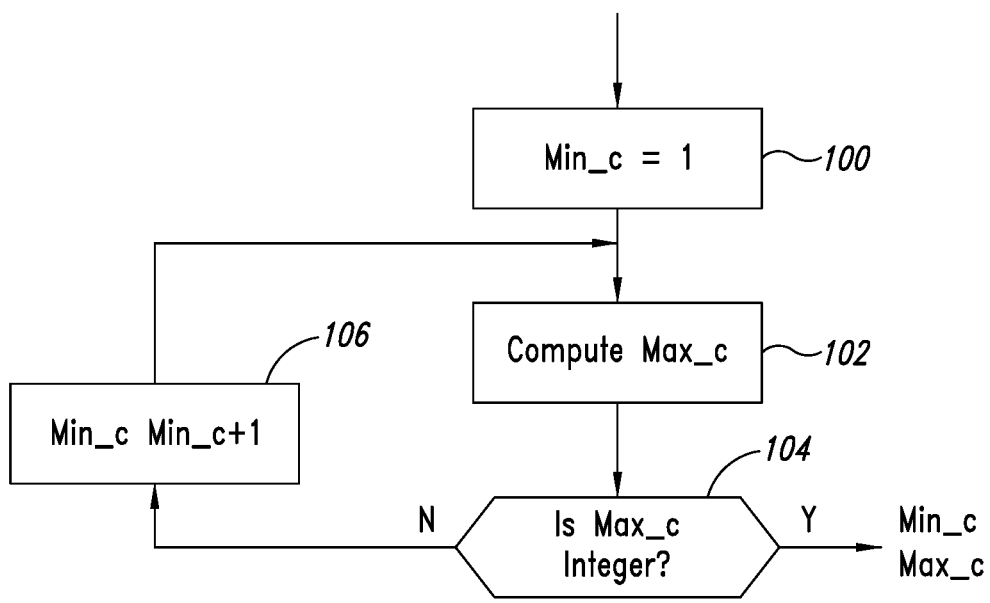
FIG. 2 is a flowchart of configuration of embodiments.

In one or more embodiments, such a pair of integers may be identified by applying the exemplary simple procedure of the flowchart of FIG. 2, involving he following steps:

set Min_c=1 (step 100)

compute Max_c as a function of the value of Min_c (step 102)

check if Max_c thus computed is an integer (step 104)

in the negative (N), increase Min_c by one (step 106) and return to step 102 in the positive (Y), use the latest values set/computed for Min_c and Max_c.

Figure 3:
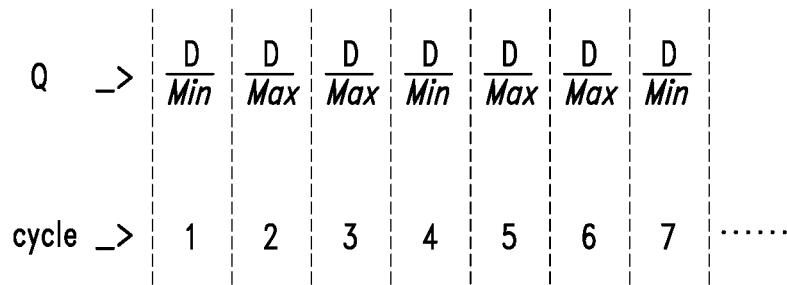
FIG. 3 is an exemplary flowchart of implementation of an embodiment.

FIG. 3 shows an exemplary sketch of how the divider 10 may be configured to perform a sequence of cycles for, e.g., M=3 where, Min=2 and Max=4 and the cycles involving division by Max (D/Max) are twice more frequent than the cycles involving division by Min (D/Min).

Figure 4:
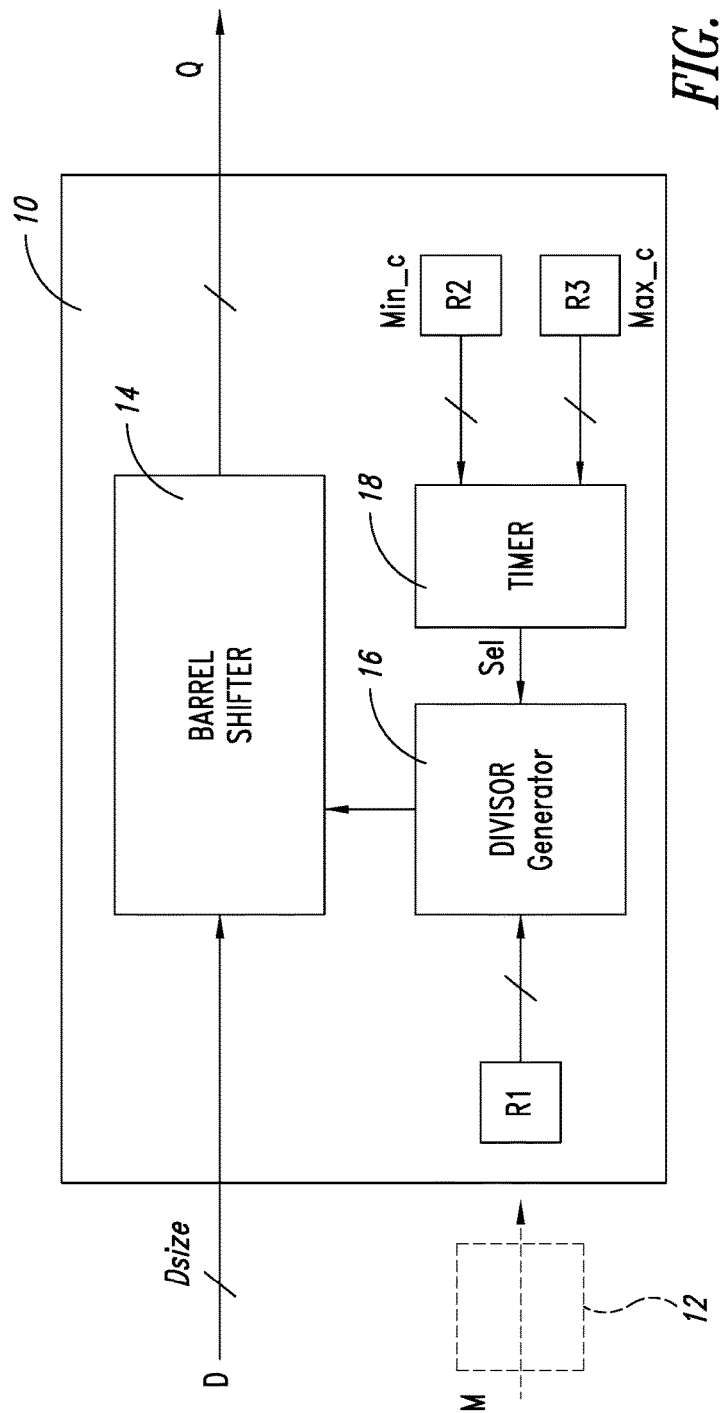
FIG. 4 is a block diagram of an exemplary architecture of an embodiment.

FIG. 4 shows an architecture and interfaces of an exemplary embodiment of a divider 10, intended to receive a dividend D as an input and to give rise to an output indicative of a quotient Q of the division of D by a divisor M.

In one or more embodiments, the divisor M may be specified by means of registers R1, R2 and R3, where:

the register R1 specifies the parameter Min (possibly $\log_2$Min), e.g., as computed (possibly off-line) starting from M by means of the configuration function/module 12 exemplified in the foregoing. In one or more embodiments, the value stored in the register R1 may be the number of right shifts needed to achieve the division D/Min: for instance, if the divisor M is 100, the stored contents of R1 may be 6, since $2^6$=64 (while $2^7$=128). In one or more embodiments the size of the register R may be $[\log_2(\lceil \log_2 MaxM \rceil)]$, MaxM being the highest divisor M supported by the divider 10;

the values in R2 and R3 may be Min_c and Max_c, e.g., as computed (possibly off-line) starting from M by means of the configuration function/module 12 exemplified in the foregoing. In one or more embodiments, these registers may have the same size of R1 in order to cover all the possible values of Min_c and Max_c.

As discussed before, the divider may be configured by means of 4 parameters, including Max. One or more embodiments may not contemplate a register for the parameter Max as this can be easily calculated internally starting from the value stored in R1.

In one or more embodiments as exemplified in FIG. 4, the divider 10 may include a barrel shifter 14, a divisor (operator) generator 16 and a timer 18.

In one or more embodiments, the timer 18 may generate a selection signal Sel, that is a signal indicating if the dividend D must be divided by Min or by Max.

Figure 5:
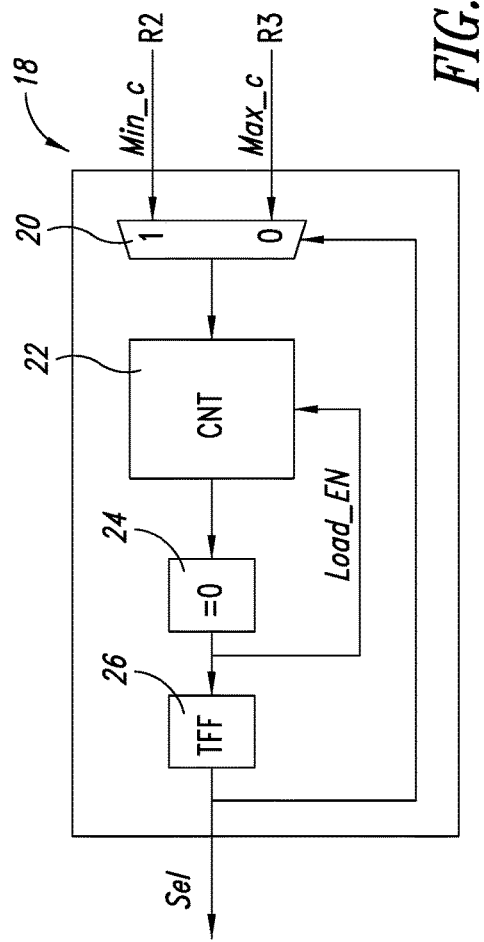
FIG. 5 is an exemplary block diagram of a timer according to an embodiment.
Figure 6:
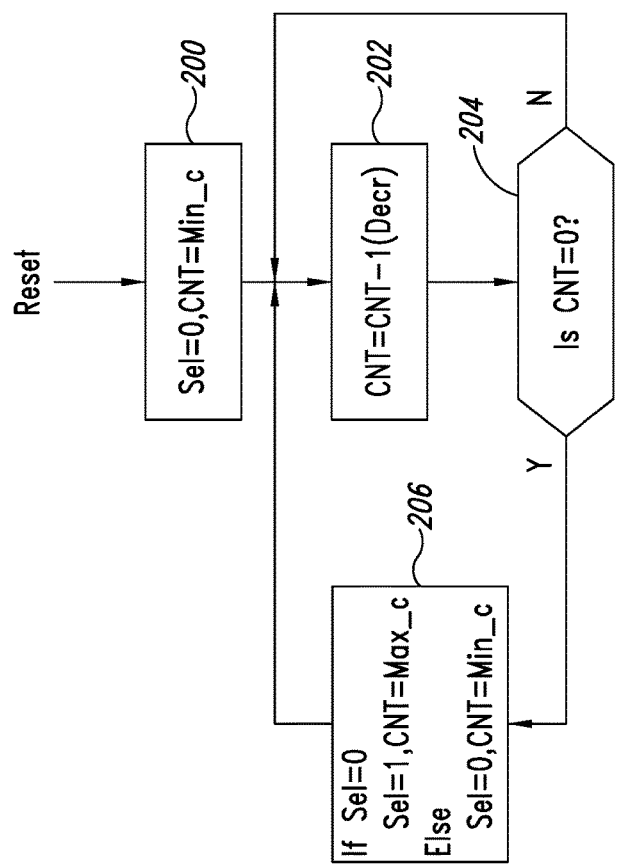
FIG. 6 is an exemplary flowchart related to FIG. 5.

In one or more embodiments, that function may be implemented by a micro-architecture as exemplified in FIG. 5 according to the flow chart exemplified in FIG. 6.

In one or more embodiments, the architecture of FIG. 5 may include:

an input multiplexer 20 receiving Min_c from the register R2 and Max_c from the register R3, a counter 22 fed by the multiplexer 20, a comparator 24 to check if the output from the counter 22 is equal to zero and provide a load enable signal Load_EN to the counter 22, a Toggle Flip-Flop (TFF) 26 driven by the comparator 24 and provide the output signal Sel, which may be also fed back to the multiplexer 20.

In one or more embodiments, the steps in the exemplary flowchart of FIG. 6 may be as follows:

after a reset, set Sel to "0" and the count CNT of the counter 22 to Min_c (step 200);

decrease count CNT by one (step 202);

check is count CNT is equal to zero (step 204);

in the negative (N), return to step 202;

in the positive (Y), proceed with step 206 where if Sel=0, set Sel to "1" and the count CNT of the counter 22 to Max_c;

else set Sel to "0" and the count CNT of the counter 22 to Min_c; and return to step 202.

Whatever the specific embodiment, a task of the timer 18 may be that of forcing inversion of the Sel signal in an alternated sequence: after Min_c cycles, after Max_c cycles, after Min_c cycles, and so on.

One or more embodiments may adopt an alternated sequence which is any alternated sequence wherein the operation (be it division or multiplication) is performed:

a certain number of times (e.g., Min_c) by using the first approximating value (e.g., Min) to produce first approximate results (D/Min), and a certain number of times (e.g., Max_c) by using the second approximating value (e.g., Max) to produce first approximate results (D/Max).

The sequence of FIG. 3, wherein individual operations performed with Min are interleaved with pairs of operations performed with Max (that is: D/Min, D/Max, D/Max, D/Min, D/Max, D/Max, D/Min and so on) is a first, non-limiting example of such an alternated sequence. Other non-limiting examples of such an alternated sequence may include D/Min, D/Max, D/Min, D/Max, D/Min, etc., or D/Min, D/Min, D/Min, D/Max, D/Max, . . . , and so on.

In one or more embodiments the alternated operation sequence may be varied (e.g., reshuffled) by varying the interleaving of the times the operation is performed by using the first power-of-two approximating value Min and the times the operation is performed by using said second power-of-two approximating value Max of the operator M.

In one or more embodiments such an action may be beneficial in order to minimize the (average) error over shorter time periods.

For instance, in one or more embodiments, the sequence of operations performed on the operand D using the first power-of-two approximating value of the operator M, namely Min, and using the second power-of-two approximating value, namely Max, e.g., D/Min, D/Min, D/Min, D/Max, D/Max, may become (according to a "reshuffled" pattern), e.g., D/Min, D/Max, D/Min, D/Max, D/Min, etc., and so on.

One or more embodiments may resort to such an optimization, e.g., when the operation sequence duration is long (many cycles) and/or Min_c and Max_c may comparable and/or the input operand may have appreciable changes over the time.

Whatever the specific embodiment, the weighted average of the first and second approximate results is representative of the (final) accurate result of operation may involve using weighing factors (e.g., the number of times or cycles Min_c and Max_c of the operations involving the approximating values Min and Max, respectively) such that the approximate results expectedly affected by a lower error (i.e., those obtained by using the approximating value Min or Max corresponding to the lower of the two differences M−Min and Max−M) "weigh" more (e.g., are calculated more often by using such "nearer" approximating value) than the approximate results expectedly affected by a higher error (i.e., those obtained by using the approximating value Min or Max corresponding to the higher of the two differences M−Min and Max−M).

Figure 7:
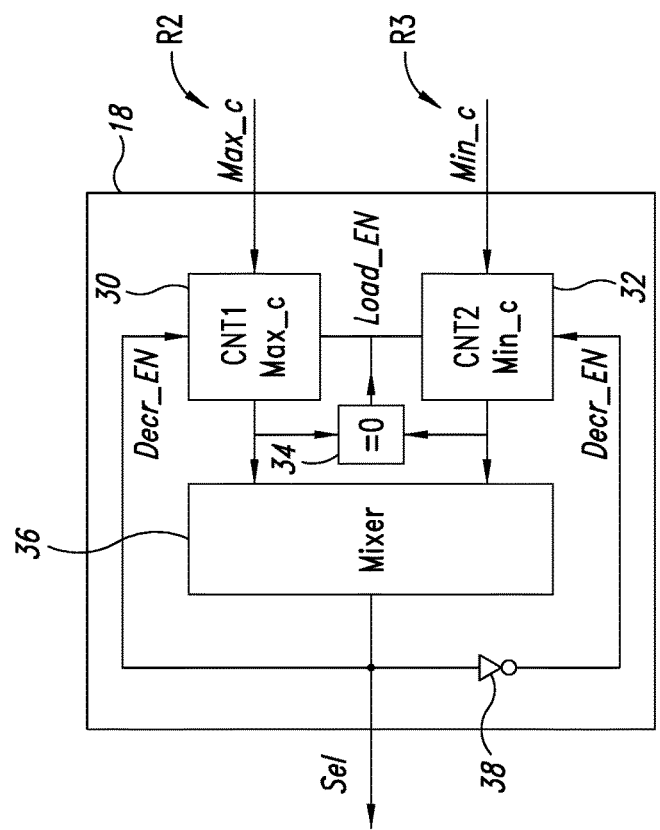
FIG. 7 is an exemplary block diagram of a timer according to an embodiment.
Figure 8:
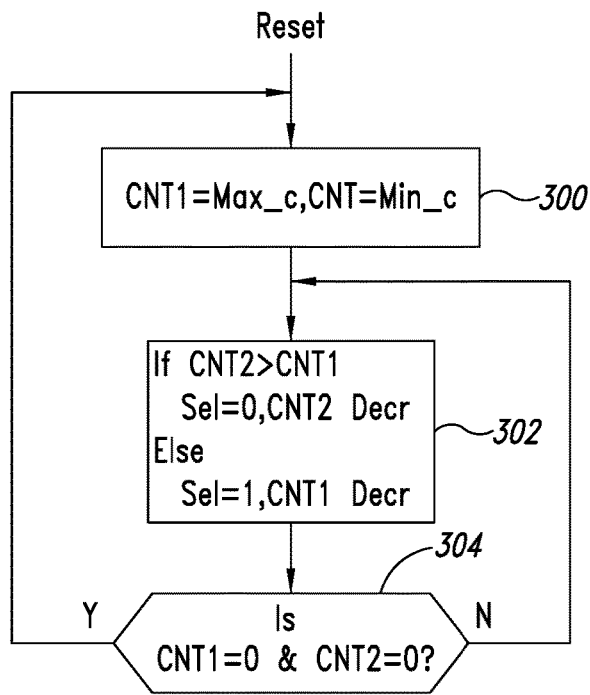
FIG. 8 is an exemplary flowchart related to FIG. 7.

The variety of possible approaches in the embodiments of the timer 18 is further exemplified by the micro-architecture of FIG. 7 and the flow chart of FIG. 8.

In one or more embodiments, the architecture of FIG. 7 may include one extra counter to interleave Min_c and Max_c decrements and a mixer block to perform the reshuffling action, with, e.g.:

two counters 30 and 32, the one receiving Min_c from the register R2 and the other receiving Max_c from the register R3, a comparator 34 to check if the output from the counters 30, 32 is equal to zero and provide to the counters 30, 32 a load enable signal Load_EN, a mixer 36 fed by the counters 30, 32 to provide the output signal Sel, which may be also fed back to the counters 30, 32 as a decrease enable signal Decr_EN (after logical inversion at 38, in the case of the counter 32).

In one or more embodiments, the steps in the exemplary flowchart of FIG. 8 may be as follows:

after a reset, set the counts CNT1 and CNT2 of the counters 30 and to Max_c and Min_c, respectively (step 300);

proceed with step 302 where if CNT2>CNT1, set Sel to "0" and decrease the count CNT2 of the counter 32;

else set Sel to "1" and decrease the count CNT1 of the counter 30 check if both counts CNT1 and CNT2 are equal to zero (step 304);

in the negative (N), return to step 302;

in the positive (Y), return to step 300.

It will be appreciated that, while step 302 has been exemplified previously as (always) selecting the larger value, the related choice is not mandatory.

In one or more embodiments, the divisor generator 16 may generate either $\log_2$Min (which is equivalent to L $\log_2$M_) or $\log_2$Max (which is equivalent to $\lceil log_2M^-\rceil$ or to L $\log_2$M_+1) according to the Sel signal.

The first power-of-two approximating value Min, and the second power-of-two approximating value Max are in fact neighboring values, with the respective exponents differing by one; the shifts of the strings of bit representative of the operand D which are effected when using the one or the other of these approximating values differ by one position.

For instance, in the exemplary case of a division by 6 (exact value of the operator), the two power-of-two approximating values will be 4 ($2^2$) and 8 ($2^3$), respectively, which will correspond to a right shift of two and three positions, respectively.

Figure 9:
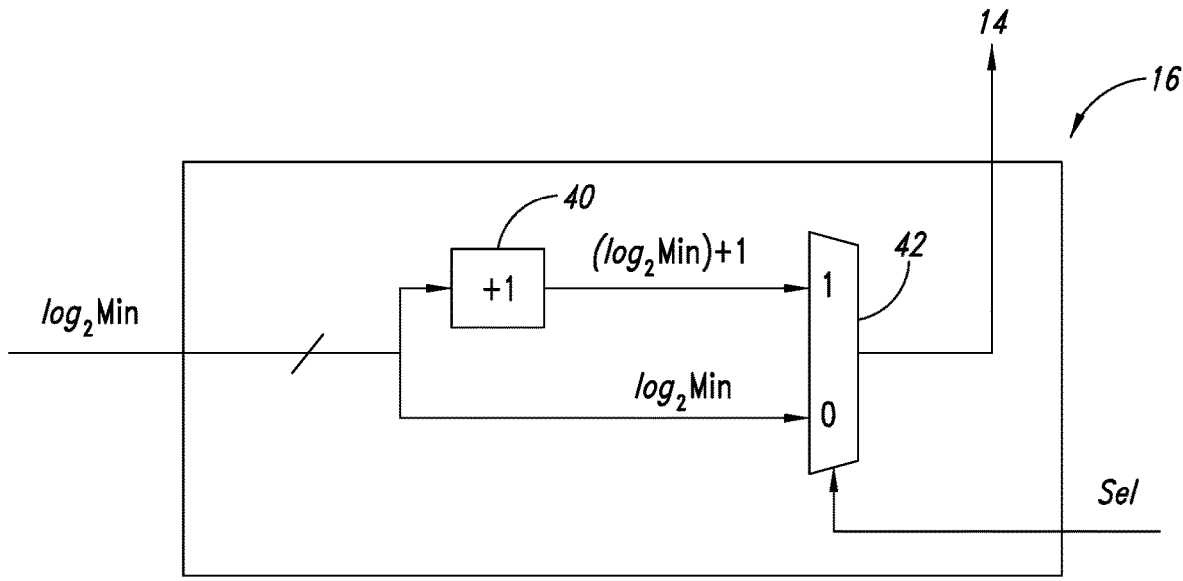
FIG. 9 is a block diagram of an exemplary implementation of a divisor generator in an embodiment.

An exemplary embodiment of a divisor generator as shown in FIG. 9 may receive the value $\log_2$Min as an input from the register R1. This value is split over two paths one of which includes a "plus 1" block 40 to produce a value $\log_2$Min+1. The two values $\log_2$Min and $\log_2$Min+1 may then be fed to a multiplexer 42 which feeds to the shifter 14 either of $\log_2$Min and $\log_2$Min+1 as a function of the value of Sel ("0" or "1") as received from the timer 18.

FIG. 10 is an an exemplary (barrel) shifter 14 which may be any known component used to perform operations (division/multiplication) by power-of-two values by right or left shifting the bit values of the string of bits representing an operand.

In one or more embodiments as schematically represented in FIG. 10, a barrel shifter 14 may be used to perform division for the following values: 1, 2, 4, 8, . . . , $2^k$, where k is the maximum possible value generated by the divisor generator 16. In the example of FIG. 10 a barrel shifter is shown including (in addition to a "notional" first branch representing division by one) k branches collectively indicated as 50, each receiving the input operand D. In one or more embodiments, two branches may be enough to support all the possible divisors between two consecutive power of two values. The branches 50 come down to a multiplexer 52 which is driven by the divisor generator, which selects the input to be output as the final, accurate result OUT (e.g., the quotient Q).

It will be appreciated that the exemplary barrel shifter 14 of FIG. 10 may not include any averaging function/module associated with the output of the multiplexer 52 (which may thus be more generally defined as a non-averaging output stage). The barrel shifter 14 of FIG. 10 is exemplary of embodiments where the (accurate) results of division (or multiplication) may derive from a weighted average of the first and second approximate results obtained by using an approximate power-of-two operator (divisor/multiplier), the averaging effect being simply achieved thanks to the fact that the barrel shifter 14 may alternatively output the first approximate results (e.g., D/Min) for Min_c cycles and the second approximate results (e.g., D/Max) for Max_c cycles following the criteria for alternating Min and Max previously exemplified in connection with operation of exemplary embodiments of the timer 18 and the divisor generator 16.

Operation of one or more embodiments has been experimented in different contexts including a PID controller 1000 according to the layout shown in FIG. 11. This layout is well known in the art, which makes it unnecessary to provide a more detailed description herein. One or more embodiments of a PID controller layout as shown in FIG. 11 may include three "gains": 1/Kp, 1/Ki and 1/Kd, which may be implemented as divisions by Kp, Ki and Kd as schematically represented by functions/modules 1002, 1004 and 1006.

The PID controller shown of FIG. 10 is exemplary of embodiments of a device where the (accurate) results of each division/multiplication may result as a weighted average of the first and second approximate results obtained by using an approximate power-of-two operator (divisor/multiplier) in the absence of any averaging function/module proper at the output of the division/multiplication (as exemplified, e.g., by the non-averaging output 52 of the shifter 14): the averaging effect may in fact be simply due to the fact that the or each division/multiplication will alternatively output the first approximate results (e.g., D/Min) for Min_c cycles and the second approximate results (e.g., D/Max) for Max_c cycles.

The processor 1000 of FIG. 11 is thus exemplary of a digital processor device, wherein the alternated sequence of the first approximate results (D/Min) and the second approximate results (D/Max) output, e.g., by the shifter 14 is propagated in the device 1000 in the absence of any average processing.

The response time, defined as the time required for the output to reach 90% of the reference applied in input, has been considered for the comparison. All the possible combinations of Kp, Ki and Kd each one in the range [4 . . . 64] have been considered (with 274625 combinations in total). The results have been averaged to perform the comparison, with error defined as the difference in percentage with respect to an ideal situation in which the dividers are precise.

The average error was found to be about 2%, in comparison with errors of 35% and 28% found when using Max or Min divisors values, the response time remaining otherwise unaffected.

Without prejudice to the underlying principles of the disclosure, the details and embodiments may vary, even significantly, with respect to what is illustrated herein purely by way of non-limiting example, without thereby departing from the extent of protection.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing, using one or more configured processing devices including a memory, a mathematical operation on an operand digital signal with an operator by,
outputting, by timer circuitry, a selection signal indicating a selection of one of a first number of bit positions or a second number of bit positions;
accessing, by operator generation circuitry, information associated with the selected one of the first number of bit positions or the second number of bit positions based on the selection signal;
outputting, by the operator generation circuitry, a control signal to one or more barrel shifters based on the accessed information associated with the selected one of the first number of bit positions or the second number of bit positions;
shifting, by the one or more barrel shifters, bits of the operand digital signal by the first number of bit positions, the first number of bit positions corresponding to a largest power-of-two value less than the operator, generating a first approximate result;
shifting, by the one or more barrel shifters, bits of the operand digital signal by the second number of bit positions, the second number of bit positions corresponding to a smallest power-of-two value greater than the operator, generating a second approximate result; and
generating, by the one or more configured processing devices, an output digital signal indicative of a result of the mathematical operation based on the first and second approximate results.

2. The method of claim 1, wherein generating the output digital signal indicative of the result of the mathematical operation comprises averaging the first and second approximate results.

3. The method of claim 1, comprising:
shifting, by the one or more barrel shifters, bits of the operand digital signal by the first number of bit positions a first plurality of times, generating a set of first approximate results;
shifting, by the one or more barrel shifters, bits of the operand digital signal by the second number of bit positions a second plurality of times, generating a set of second approximate results; and
generating, by the one or more configured processing devices, the output digital signal indicative of the result of the mathematical operation based on the first and second sets of approximate results.

4. The method of claim 3, comprising:
alternately generating, by the one or more configured processing devices, a subset of the set of first approximate results followed by a subset of the set of second approximate results.

5. The method of claim 4 wherein said alternating is periodic with a first number of the set of first approximate results and a second number of the set of second approximate results being generated in each period.

6. The method of claim 3, comprising interleaving generation of the set of first approximate results with generation of the set of second approximate results, by the one or more configured processing devices.

7. The method of claim 3, comprising averaging, by the processing circuitry, the set of first approximate results and the set of second approximate results.

8. The method of claim 1, comprising:
determining, by the one or more configured processing devices, which one of the first number of bit positions and the second number of bit positions corresponds to a power-of-two closest to the operator; and
performing shifting of the operand digital signal using the determined one of the number of bit positions more often than shifting is performed using the other one of the number of bit positions.

9. The method of claim 3, comprising:
determining, by the one or more configured processing devices, which one of the first number of bit positions and the second number of bit positions corresponds to a power-of-two closest to the operator; and
setting values of the first number of times and the second number of times based on the determination.

10. The method of claim 1 wherein the mathematical operation is one of a multiplication operation and a division operation.

11. The method of claim 3 wherein the operand digital signal varies with time.

12. A system, comprising:
mathematical operation circuitry, which, in operation:
generates first approximate results by shifting, by one or more barrel shifters, bits of an operand digital signal by a first number of bit positions, the first number of bit positions corresponding to a largest power-of-two value less than a mathematical operator;
generates second approximate results by shifting, by the one or more barrel shifters, bits of the operand digital signal by a second number of bit positions, the second number of bit positions corresponding to a smallest power-of-two value greater than the mathematical operator, to generate second approximate results; and generates result signals based on the first and second approximate results; and one or more processing devices coupled to an output of the mathematical operation circuitry, wherein the mathematical operation circuitry comprises:

timer circuitry, which, in operation, outputs a selection signal indicating a selection of one of the first number of bit positions or the second number of bit positions; and operator generation circuitry, which, in operation:

accesses information associated with the selected one of the first number of bit positions or the second number of bit positions based on the selection signal; and outputs a control signal to the one or more barrel shifters based on the accessed information associated with the selected one of the first number of bit positions or the second number of bit positions.

13. The system of claim 12 wherein the one or more processing devices comprises a proportional and integral controller, which, in operation, receives the result signals.

14. The system of claim 12 wherein the mathematical operation circuitry comprises one or more registers, which, in operation, store the information associated with the first number of bit positions and the second number of bit positions.

15. The system of claim 12 wherein the timer circuitry comprises:

a multiplexer;

a counter coupled to an output of the multiplexer;

a comparator coupled to an output of the counter; and a flip-flop coupled to an output of the comparator.

16. A non-transitory computer-readable medium whose contents configure one or more electronic processing devices to perform a mathematical operation on an operand digital signal with an operator by, outputting, by timer circuitry, a selection signal indicating a selection of one of a first number of bit positions or a second number of bit positions;

accessing, by operator generation circuitry, information associated with the selected one of the first number of bit positions or the second number of bit positions based on the selection signal;

outputting, by the operator generation circuitry, a control signal to one or more barrel shifters based on the accessed information associated with the selected one of the first number of bit positions or the second number of bit positions;

shifting, by the one or more barrel shifters, bits of the operand digital signal by the first number of bit positions, the first number of bit positions corresponding to a largest power-of-two value less than the operator, generating a first approximate result;

shifting, by the one or more barrel shifters, bits of the operand digital signal by the second number of bit positions, the second number of bit positions corresponding to a smallest power-of-two value greater than the operator, generating a second approximate result; and generating a result of the mathematical operation based on the first and second approximate results.

17. The non-transitory computer-readable medium of claim 16 wherein performing the mathematical operation includes:

shifting, by the one or more barrel shifters, bits of the operand digital signal by the first number of bit positions a first plurality of times, generating a set of first approximate results;

shifting, by the one or more barrel shifters, bits of the operand digital signal by the second number of bit positions a second plurality of times, generating a set of second approximate results; and generating the result of the mathematical operation based on the first and second sets of approximate results.

18. The non-transitory computer-readable medium of claim 17 wherein performing the mathematical operation includes interleaving generation of the set of first approximate results with generation of the set of second approximate results.

19. The non-transitory computer-readable medium of claim 17 wherein performing the mathematical operation includes:

identifying one of the first number of bit positions and the second number of bit positions which corresponds to a power-of-two closest to the operator; and setting values of the first number of times and the second number of times based on the identification.

* * * * *